United States Patent [19]

Newkirk

[11] 4,146,420
[45] Mar. 27, 1979

[54] ROTARY SEALING MACHINE FOR THERMOPLASTIC ARTICLES

[75] Inventor: Raymond K. Newkirk, Mound, Minn.
[73] Assignee: Tape Inc., Hopkins, Minn.
[21] Appl. No.: 878,672
[22] Filed: Feb. 17, 1978
[51] Int. Cl.² ............................................. B32B 35/00
[52] U.S. Cl. .................................... 156/499; 53/555; 53/559
[58] Field of Search ........... 156/499; 53/30 R, 180 R, 53/182 R, 184 R; 425/116, 122, 233, 261, 267, 388, 395, 408, 429, 430, 444, 451.4

[56] References Cited

U.S. PATENT DOCUMENTS

| | | | |
|---|---|---|---|
| 1,481,866 | 1/1924 | Heist | 53/184 R |
| 2,549,123 | 4/1951 | Osterhof | 53/184 R |
| 2,663,130 | 12/1953 | Donofrio | 53/30 R |
| 2,886,931 | 5/1959 | Karpowicz | 53/184 R |
| 3,143,454 | 8/1964 | Hannon | 156/499 |
| 3,269,088 | 8/1966 | Kath | 53/184 R |
| 3,290,860 | 12/1966 | Rau | 53/184 R |
| 3,354,611 | 11/1967 | Powell | 53/184 R |
| 3,465,496 | 9/1969 | Hansen | 53/184 R |
| 3,579,960 | 5/1971 | Mehta | 53/184 R |
| 3,759,011 | 9/1973 | Akke | 53/184 R |
| 3,805,486 | 4/1974 | Maheffy et al. | 53/184 R |
| 3,850,780 | 11/1974 | Crawford et al. | 53/182 R |

*Primary Examiner*—Caleb Weston
*Attorney, Agent, or Firm*—Orrin M. Haugen; Thomas J. Nikolai

[57] ABSTRACT

A machine for facilitating the simultaneous heating, bonding or sealing of a group of thermoplastic articles retained within a rotary sealing system. First and second rotatable workpiece carriers are arranged to transport the workpieces to be bonded, step-by-step, from loading stations to a heating station, and subsequently, to a bonding station, thereby accomplishing a plurality of operations on a simultaneous basis. The same drive mechanism used to incrementally rotate the workpiece carriers also imparts a reciprocating motion to the heating element and an arcuate reciprocating motion to the workpiece carriers for first applying heat energy to the workpieces for a predetermined time interval and for subsequently applying compressive forces to the heated workpieces undergoing bonding and thereafter releasing the now-joined workpieces from the carriers. There is a minimal movement required of the work, thus with the simultaneous occurrence of loading, heating, and bonding, the rate of speed for the system is substantially increased.

9 Claims, 4 Drawing Figures

ROTARY SEALING MACHINE FOR THERMOPLASTIC ARTICLES

BACKGROUND OF THE INVENTION

I. Field of the Invention

This invention relates to bonding or sealing apparatus for thermoplastic articles and more specifically to the novel design of a combined rotary and linear drive mechanism for transporting the workpieces incrementally from a loading station to a heating station and from there to a bonding station where the articles to be joined are subjected to a compressive force following the heating step. The system of the present invention adapts itself to the use of stationary platens, although if the geometry of the work requires, modest movement of the platens may be undertaken without adversely affecting the speed of operation of the entire system.

II. Description of the Prior Art

Many different bonding or sealing machines for joining thermoplastic surfaces together are known in the art. It is a common practice to transport the articles to be bonded from a work station, through a heating zone and to a bonding zone where the parts to be joined are subjected to substantial compressive forces during the period that the thermoplastic articles are cooled. For example, there is disclosed in the Karpowicz U.S. Pat. No. 2,886,931 a machine for forming and sealing plastic packages and which utilizes incrementally rotatable roller members for advancing thermoplastic material to a bonding station where a heated segment of the rotary members effects the bond or seal. A review of the device described in the Karpowicz patent immediately shows that it is quite complex in terms of the drive mechanism employed and the various electromechanical controls used to drive, form, heat and bond the surfaces to be joined. Then too, the apparatus disclosed in the aforementioned Karpowicz patent is only suitable for bonding sheet-like materials together and is, thus, somewhat limited in its application.

Still other prior art devices of a similar type are set forth in the Akke U.S. Pat. No. 3,759,011, the Kath U.S. Pat. No. 3,269,088 and the Hansen U.S. Pat. No. 3,465,496. In each of these arrangements, rotary members driven in opposite directions and intersecting generally along a line of contact, are used to advance the materials to be joined and to apply the required heat and compressive forces to effect bonding. Again, each of these prior art machines tends to be somewhat complex in its construction and is suitable only for use with continuous sheet materials.

SUMMARY OF THE INVENTION

The present invention is deemed to be a substantial improvement over known prior art devices for bonding or sealing thermoplastic materials, one to the other. In accordance with the teachings of the present invention, first and second rotary members are adapted to be driven in opposed directions in a step-by-step fashion and at a rate determined by the rotation of a cam. The cam is operatively coupled to the rotary members through a novel linkage which not only imparts incremental or step-wise motion to the rotary members but also imparts a generally linear but essentially arcuate motion therebetween such that opposed surfaces thereof are periodically brought together with a predetermined compressive force and subsequently separated. In addition, the linkage may, if geometry of the work requires, also impart a reciprocating motion to a heater bar or platen, the dwell time of the heater with respect to the workpieces being also determined by the rate at which the aforementioned cam is driven. Thus, precise control may be maintained over the heat energy applied to the materials to be bonded and to the amount of compressive force which is subsequently applied during the bonding process. The overall affect of the system is to increase the production speed, while conserving the quantity of energy required since the workpieces are moved only a minimal distance between heating and sealing. The configuration of the present system is distinguished from that of a multi-indexing machine which normally requires a greater spacing between the operating stations, for example, the heating station and the sealing station, and hence a considerable saving in both time and energy may be achieved.

It accordingly is the principal object of the present invention to provide a new and improved machine for facilitating the bonding or sealing of thermoplastic articles, with the machine being capable of sustained high rates of production.

A further object of the invention is to provide a machine of the type described which is relatively simple in its construction and reliable and safe in its operation.

Still another object of the invention is to provide a new and improved machine for bonding or sealing thermoplastic articles which, in addition to imparting rotary motion to the workpiece carriers, also imparts arcuate reciprocating motion between the rotatable workpiece carriers to facilitate bonding and subsequent release of the joined workpieces.

Still a further object of the invention is to provide a simplified mechanism for imparting reciprocating motion between workpieces located at a heating station and the heater bar used to impart the heat energy to the workpieces such that only modest motion is required for transporting the individual components from the heating station to the bonding or sealing station, thereby enabling precise control to be maintained during the entire series of operations.

These and other objects and advantages of the present invention will become apparent to those skilled in the art from the following detailed description of the preferred embodiment when considered in conjunction with the accompanying drawings in which like numerals in the several views refer to corresponding parts.

DESCRIPTION OF THE PREFERRED EMBODIMENT

Figure 1:
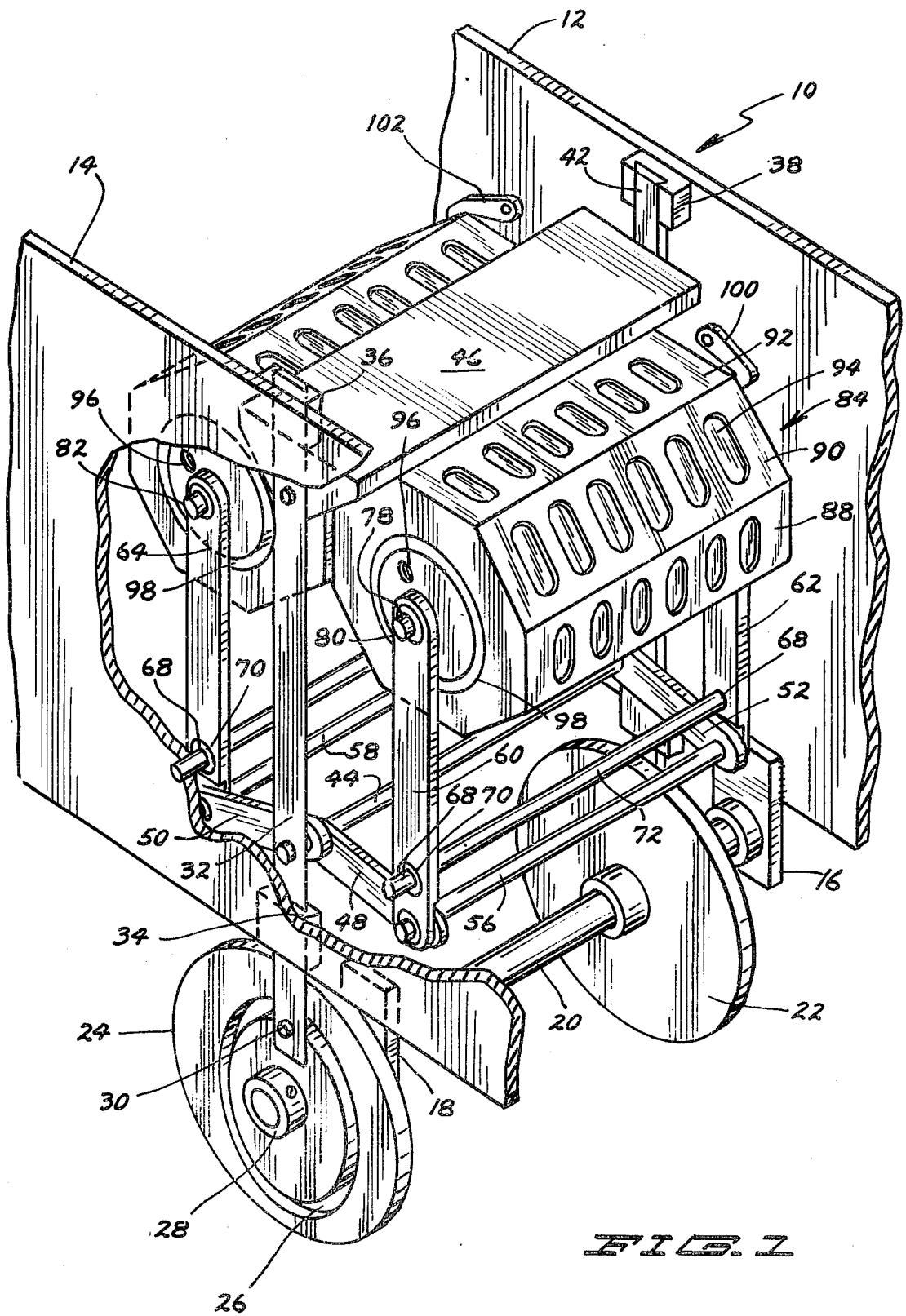
FIG. 1 is a perspective view which is partially broken away to reveal the operative elements of the machine forming the preferred embodiment.

Referring now to FIG. 1, there is indicated generally by numeral 10 the rotary sealing machine constructed in accordance with the present invention. Included are first and second side plates 12 and 14 which form a part of the framework of the machine. The remaining portions of the machine are supported between the parallel, spaced apart side plates 12 and 14, all as will be more fully set forth hereinbelow. Each of the side plates 12 and 14 has a shaft support bracket welded or otherwise affixed thereto, the support bracket having a bore passing therethrough for accepting opposed ends of a cam shaft 20. The cam shaft 20 is supported for rotation in the brackets 16 and 18 and may include a suitable sleeve bearing formed from a porous material such as Oilite. Alternatively, ball or roller bearings may also be utilized.

Affixed to the cam shaft 20 is a driven pulley or gear 22 which may be coupled directly to a source of motive power, such as an electric motor (not shown). If desired, rather than having a direct coupling between the motor and the driven gear 22, it may be desirable to include a suitable transmission for matching the shaft speed of the motor to the rotary sealing machine 10.

Affixed to one end of the cam shaft 20 is a circular disc 24 having an orbital groove 26 formed in one surface thereof and extending inwardly therefrom. The disc 24 may be secured to the shaft 20 by means of an integrally formed collar 28 which surrounds the shaft and which includes a key or set screw.

The orbital groove 26 is arranged to cooperate with a cam follower 30 which is coupled for rotation in a heater bar lifting rod 32. The heater bar lifting rod 32 is disposed within a lower guide member 34 and an upper guide member 36 for reciprocating motion along a generally vertical straight line. The heater bar lifting rod 32 preferably has a tapered cross-section to fit within a tapered slot in the guide members 34 and 36 so as to be free to move back and forth in only one direction. The guide members 34 and 36 may be welded or otherwise attached to the side plate 14.

Disposed on the inner surface of the side wall 12 is another pair of guide members 38 and 40 for supporting a second heater bar lifting rod 42 for reciprocal motion therewithin. A cross bar 44 passes between the two heater bar lifting rods 32 and 42 which causes the two rods to move up and down in phase with one another as the cam follower 30 traverses the profile of the orbital groove 26 during rotation of the disc 24.

Figure 3:
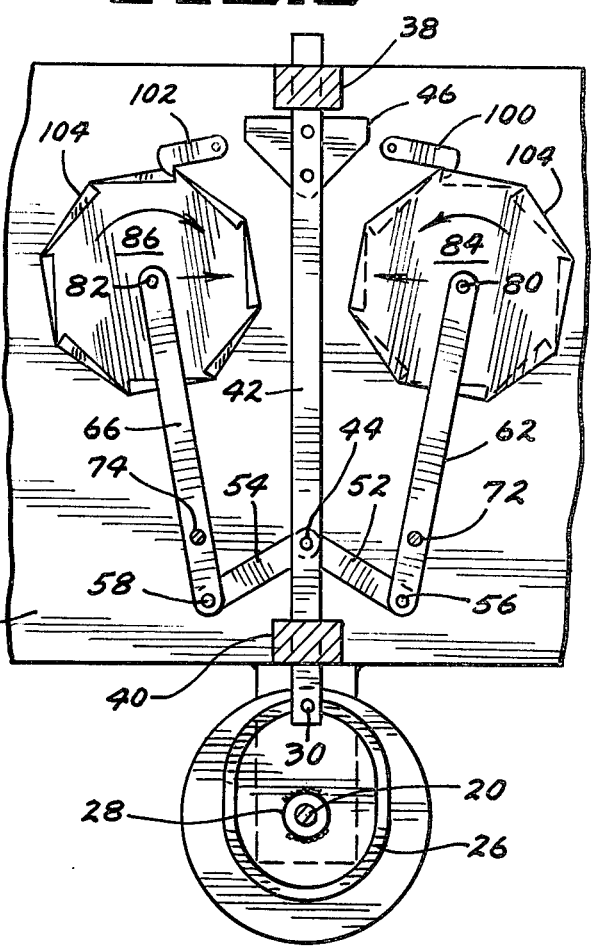
FIG. 3 is an end, cross-sectional view showing the orientation of the various parts of the machine during its advance and release step.
Figure 4:
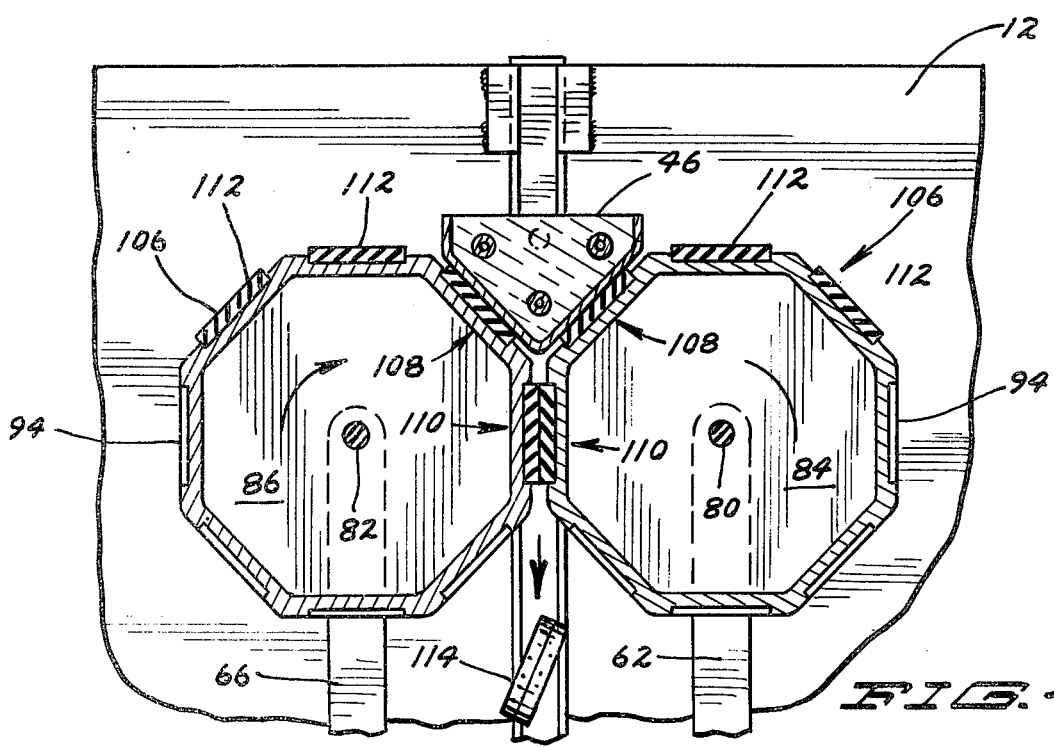
FIG. 4 is a further cross-sectional view showing the manner in which workpieces to be joined are brought together during the heating and bonding steps.

Fixedly secured to the upper ends of the heater bar lifting rods 32 and 42 is a wedge-shaped heating bar assembly 46. Disposed within the heating bar 46, but not shown, are electrical heating elements which are adapted to be energized by a suitable source of electrical current (also not shown). Generally, the entire heating bar assembly 46, including the electrical heating elements form a pair of angularly disposed heating platens along those surfaces which make intermittent contact with the surfaces of the work, these being the surfaces disposed at the angularly disposed lower surfaces of the assembly 46 as shown in FIGS. 3 and 4.

Coupled to the connecting rod 44 in proximity to each end thereof are first and second pairs of linkages including linkages 48 and 50 in proximity to the side plate 14 and linkages 52 and 54 which are disposed nearest the right side plate 12. The linkages 48–50 and 52–54 are free to rotate at one end thereof about the cross bar 44.

Each of the aforementioned linkage members has a hole formed at its opposite end, i.e., the end opposite that which is coupled to the cross bar 44, and connecting rods 56 and 58 pivotally intercouple the linkage 48 to the linkage 52 and the linkage 50 to the linkage 54.

Pivotally secured to opposite ends of the connecting rod 56 are first and second roller support arms 60 and 62. Similarly, pivotally coupled to opposed ends of the connecting rod 58 are roller support arms 64 and 66.

A circular bore 68 is formed through each of the roller support arms 60, 62, 64 and 66 in proximity to, but spaced apart from, the bores through which the connecting rods 56 and 58 pass. A brass bushing as at 70 is inserted into each of the bores 68 and extending through the bushings between the roller support arms 60 and 62 is a pivot rod 72. In a similar fashion, a pivot rod 74 passes through the bushings 70 on the support arms 64 and 66. The pivot rods 72 and 74 extend beyond the outer surfaces of the roller support arms and are secured at their opposed ends to the side plates 12 and 14.

Located at the upper ends of the support arms 60, 62 and 64, and 66 are circular bores 76 each having a sleeve bushing 78 disposed therein and extending through the bushings on the arms 60 and 62 is a roller support axle 80. Similarly, the upper ends of the roller support arms 64 and 66 are also provided with a bore and associated bushing and a roller support axle 82 passes therethrough and extends between the upper ends of the roller support arms 64 and 66. The axle 80 rotatably supports a first rotatable workpiece carrier indicated generally by numeral 84. In the same way, the axle 82 supports a second rotatable workpiece carrier indicated generally by numeral 86.

As is indicated in the drawings, the workpiece carrier members comprise a generally closed, hollow, cylindrical structure having a cross-section in the form of a regular polygon, thereby defining a plurality of generally flat peripheral surfaces as at 88, 90 and 92 in FIG. 1. While the figures indicate an octagonal cross-section, thereby defining eight generally flat facets or surfaces, a greater or lesser number may be employed and limitation thereto should not be inferred. Formed in each of the planar surfaces of the rotatable carriers 84 and 86 are one or more apertures as at 94 which extend completely through the peripheral surfaces. The shape of the apertures 94 is dependent upon the configuration of the workpieces to be bonded and the generally oval shape indicated is completely aribitrary and exemplary only.

In order to more positively hold one or more workpieces in place on the planar surfaces of the rotatable work carriers, a suitable vacuum source may be coupled to the drum members 84 and 86 at the threaded apertures 96 formed in one of the end walls of the drum enclosure. A suitable slip ring seal may be provided so that the vacuum hose coupled into the threaded apertures 96 may be maintained in a relatively stationary orientation as the drum revolves.

In order to impart rotary motion to the workpiece carriers 84 and 86, a ratchet and pawl assembly is provided. More specifically, there is pivotally mounted on the inner surface of the side wall 12 first and second pawls 100 and 102 adapted to engage a ratchet ring 104 which is secured to the end wall of the rotatable workpiece carriers 84 and 86.

Now that the constructional features of the preferred embodiment have been set forth in detail, consideration will next be given to the mode of operation.

OPERATION

Figure 2:
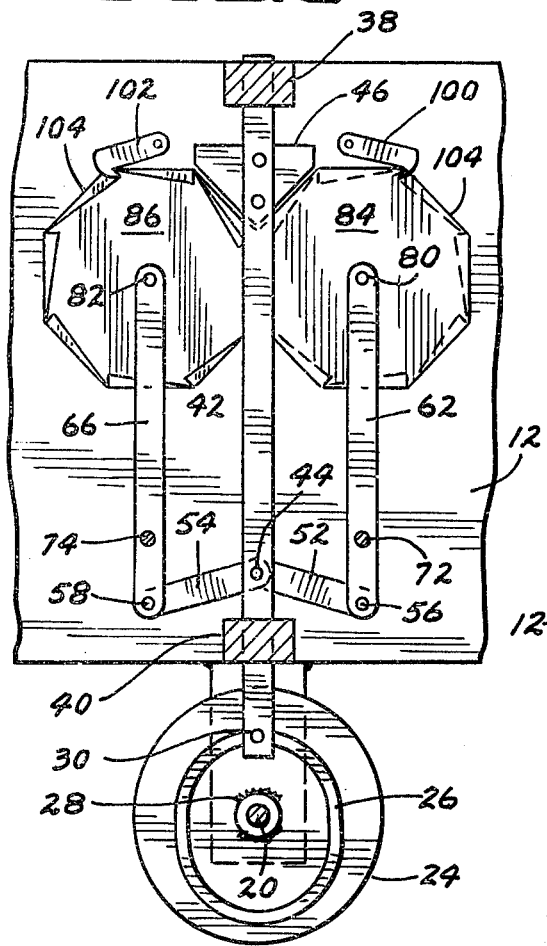
FIG. 2 is an end view, partially cross-sectioned, showing the disposition of the various machine parts during the heating and bonding step.

With reference to FIGS. 2 and 3, it can be seen that the orbital groove 26 is eccentrically disposed with respect to the cam shaft 20 such that as the cam 24 is rotated by means of a motor (not shown) coupled to the driven gear 22, the heater bar support arms 32 and 42 which are coupled together by means of the connecting rod 44, will be reciprocally driven, up and down, within the guide plates 34-36 and 38-40. It should be observed that the reciprocal motion of the heater assembly 46 occurs simultaneously with the lateral arcuate motion of the drums, thereby increasing the speed of the entire operation, and thus contributing to the precise thermal control of the overall arrangement.

FIG. 2 illustrates the orientation of the various parts when the heater bar support arms 32 and 42 are in their lowermost position as determined by the cam profile of the orbital groove 26. As the cam 24 is rotated from the position shown in FIG. 2, the heater bar support arms 32 and 42 remain in the position illustrated in FIG. 2 for a predetermined period (dwell time) because of the generally concentric orientation of the groove 26 with respect to the shaft 20. However, a point is reached where the groove 26 becomes more and more eccentric with respect to the center of the shaft 20 and the cam follower 30 will force the heater bar support arms in an upward direction. The motion of these support arms is coupled through the linkages 48-50 and 52-54 to the lower ends of the workpiece carrier support arms 60-64 and 62-66. Since the support arms are pivotally secured to the end plates 12 and 14 by means of the pivot rods 72 and 74, upward translational motion of the heater bar lift arms 32 and 42 will cause the support arms 60 and 62 to rotate about the pivot bar 72 in a clockwise direction. Similarly, the upward movement of the heater bar support arms 32 and 42, acting through the linkages 50 and 54 will cause the workpiece carrier support arms 64 and 66 to rotate about the pivot rod 74 in a counterclockwise direction. Thus, the work carriers 84 and 86 will be separated one from the other and at the same time the heater bar 46 is elevated out of engagement with the mating surfaces of the workpiece support drums 84 and 86.

FIG. 3 illustrates the orientation of the various parts when the heater bar lifting arms 32 and 42 are in their highest point of travel. It can be observed that as the cam rotates from the position shown in FIG. 2 to the position shown in FIG. 3, that the pawls 100 and 102 grip the ratchet ring 104 and as the rotatable drums 84 and 86 swing arcuately outward, rotational motion about the axles 80 and 82 will take place. Specifically, pawl 100 will operate upon the ratchet of the drum 84 to cause it to rotate in a counterclockwise direction whereas the pawl 102 cooperates with the ratchet ring 104 on the drum 86 to cause it to rotate in the clockwise direction.

As the cam 24 continues to rotate, the heater bar support arms 32 and 42 will again move downward causing the workpiece carriers to assume a closed relationship, one with the other, as illustrated in FIG. 2, thus completing a complete cycle.

Summarizing for a moment, then, a complete cycle of revolution of the cam 24 results in the following sequence of events:
1. The heater bar 46 is lifted as the workpiece carrier drums separate.
2. The work carrier support drums are rotated one step in an opposed direction with respect to one another.
3. The workpiece carrier drums are returned to their relative position of close engagement as the heater bar 46 is lowered into an operative position with respect to mating faces on the workpiece carrier.

The cross-sectional view of FIG. 4 is deemed helpful in further understanding the operation of the invention. In this figure, the numeral 106 identifies the workpiece loading station. During the dwell period established by the configuration of the orbital groove 26 in the cam 24, an operator inserts workpieces identified by numeral 112 into the workpiece holding apertures 94 provided in the periphery of the workpiece transporting drums 84 and 86. As the cam rotates, the workpieces will be advanced through the rotation of the drums 84 and 86 in a step-wise or incremental fashion until they reach the heating zone identified by numeral 108. After reaching this zone, the wedge-shaped heater bar 46 is lowered into engagement with the outer surfaces of the workpieces 112 so as to soften or melt the thermoplastic material comprising the workpieces. Again, as the cam 24 continues to rotate, the heater bar 46 will again be lifted out of engagement and the drums 84 and 86 will be rotated one more step in opposed directions with respect to one another so as to arrive at the bonding station 110. Again, continued rotation of the cam 24 will cause the workpieces located at the bonding station to be brought into intimate contact with one another under a predetermined pressure which is established by the relative length of the linkages 48-50 and 52-54 and their point of connection with respect to the heater bar lifting arms 32 and 42. Because of the predetermined dwell time built into the cam 24, the workpieces at the bonding station 110 will remain compressed, one against the other, as the heated thermoplastic material cools. During the next cycle of the cam 24, as the drum members 84 and 86 separate from one another, the bonded workpieces will be separated from their engagement with the apertures 94 and will drop free as indicated by the bonded product 114 in FIG. 4.

A distinct advantage afforded by the preferred embodiment is that the load bearing members such as the arms 32 and 42 and the arms 60-62 and 64-66 are generally oriented in a vertical direction and that very little weight is being moved in a generally horizontal direction. As such, very little work is being done in a physical sense, resulting in relatively low energy requirements. Also, the feature of only modest motion being required results in the capability of exercising precise control over the thermal characteristics required in the overall sealing operation. Also, it is to be noted that because of the step-by-step rotation and reciprocal engagement between the wedge-shaped heater bar 46 and the workpieces that little or no wiping action between mating surfaces takes place. This helps to reduce any distortion of the workpieces during the heating phase of operation. Similarly, the heated workpieces are brought into engagement by a force which is generally normal to the heated surfaces thereof during the bonding step, thus also precluding misalignment or flashing which might otherwise be caused if wiping contact were present. The amount of heat energy applied to the workpieces is determined by the temperature of the wedge-shaped heater bar 46 and by the dwell time established by the cam profile 26. Thus, it is possible to use a variety of thermoplastic materials in the bonding or sealing machine of the present invention.

A typical cycle time for the apparatus of the present invention is from between about 2 seconds and 6 seconds, although for certain unusual configuration of parts, up to about 8 seconds may be required. In this period of time, therefore, loading, heating, and bonding will be expected to be accomplished. The speed of the various operations may, of course, be appropriately matched, with the thermal requirements of heating normally being the specific operation which will ultimately determine the production speed for the entire assembly. In certain instances, again depending upon the configuration of the parts being treated, the sealing operation may determine the ultimate speed capability. All in all, therefore, a suitable match of time and temperature for the entire operation can be undertaken and determined for each of the individual parts being joined. Such considerations are well within the capability of those reasonably skilled in the art and will depend primarily upon the materials being utilized, as well as the geometry thereof.

It will thus be seen that the objects set forth above, among those made apparent from the preceding description, are efficiently attained and, since certain changes may be made in the preferred embodiment without departing from the scope of invention, it is intended that all matter contained in the above description or shown in the accompanying drawings shall be interpreted as illustrative and not in a limiting sense.

It is also to be understood that the following claims are intended to cover all of the generic and specific features of the invention herein described, and all statements of the scope of the invention which, as a matter of language, might be said to fall therebetween.

I claim:

1. A machine for bonding thermoplastic articles comprising:
   (a) a frame including a pair of spaced apart, generally parallel side members;
   (b) first and second rotatable workpiece carriers mounted for rotation about first and second parallel axles extending generally transverse to the planes of said side plates;
   (c) a cam having a predetermined cam profile formed thereon and adapted to be rotated by a source of rotational power;
   (d) linkage means cooperating between said cam profile and said first and second parallel axles for cyclically imparting oscillating translational motion to said first and second parallel axles in opposed directions generally transverse to the longitudinal axes of said axles and for simultaneously imparting incremental rotation in opposite directions to said first and second rotatable workpiece carriers during at least a portion of the period of said translational motion of said first and second axles; and
   (e) heating means coupled to said linkage means for applying heat energy to workpieces supported by said first and second workpiece carriers during a predetermined portion of said oscillating translational motion of said first and second parallel axles.

2. Apparatus as in claim 1 wherein each of said workpiece carriers further includes a ratchet member and wherein said last mentioned means includes first and second pawls pivotally attached to one of said side members for engaging said ratchet member.

3. Apparatus as in claim 1 wherein said cam profile includes first and second generally semicircular track portions of equal radius spaced apart from one another by first and second straight track portions, the axis of rotation of said cam being at a point which is eccentric with respect to one of said first and second semicircular track portions and generally on a line passing through the centers of said semicircular tracks, said first and second straight track portions providing a predetermined dwell during said translational motion of said first and second parallel axles.

4. Apparatus as in claim 1 wherein said workpiece carriers each comprise a cylinder having a cross-section in the form of a regular polygon to thereby define a plurality of generally flat peripheral surfaces and mounted individually on said first and second parallel axles for rotation thereabout.

5. Apparatus as in claim 4 wherein said workpiece carriers include at least one recess on each of said plurality of flat surfaces for at least temporarily retaining a thermoplastic article therein.

6. Apparatus as in claim 5 wherein means are provided for applying a vacuum internal to said cylinder in proximity to said recesses.

7. Apparatus as in claim 1 wherein said linkage means comprises:
   (a) first and second elongated rods slidingly secured individually to said pair of side members, a first of said rods being operatively coupled to said cam profile;
   (b) first, second, third and fourth axle support arms, each having first and second end portions and being pivotally coupled, in pairs, at a point intermediate said first and second end portions, to said pair of spaced apart side members, said first axle being journaled for rotation in said first end portions of said first and second axle support arms and said second axle being journaled for rotation in said first end portions of said third and fourth axle support arms;
   (c) a first pivot rod journaled for rotation in said second end portions of said first and second axle support arms and a second pivot rod journaled for rotation in said second end portions of said third and fourth axle support arms; and
   (d) a first pair of linkages rotatably coupled to said first elongated rod and individually to said first and second pivot rods at one end thereof and a second pair of linkages rotatably coupled to said second elongated rod and individually to said first and second pivot rods at the other end thereof.

8. Apparatus as in claim 7 wherein said heating means is attached to and disposed between said first and second elongated rods.

9. Apparatus as in claim 8 wherein said heating means is a generally wedge-shaped elongated member.

* * * * *